US006292192B1

(12) United States Patent
Moreton

(10) Patent No.: US 6,292,192 B1
(45) Date of Patent: Sep. 18, 2001

(54) SYSTEM AND METHOD FOR THE DIRECT RENDERING OF CURVE BOUNDED OBJECTS

(75) Inventor: Henry Packard Moreton, Woodside, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/005,129

(22) Filed: Jan. 9, 1998

(51) Int. Cl.[7] .................................................. G06T 11/40
(52) U.S. Cl. ............................................ 345/430; 345/423
(58) Field of Search .................................... 345/423, 427, 345/430, 441, 442, 467, 468, 141, 142

(56) References Cited

U.S. PATENT DOCUMENTS

| | | | |
|---|---|---|---|
| 4,213,252 | * | 7/1980 | Sullivan et al. ...................... 35/10.24 |
| 5,175,806 | * | 12/1992 | Muskovitz et al. .................... 395/125 |
| 5,287,438 | * | 2/1994 | Kelleher ................................ 395/132 |
| 5,315,537 | * | 5/1994 | Blacker ................................. 364/570 |
| 5,355,449 | * | 10/1994 | Lung et al. ............................ 395/150 |
| 5,438,656 | * | 8/1995 | Valdes et al. ......................... 395/143 |
| 5,877,771 | * | 3/1999 | Drebin et al. ......................... 345/430 |
| 5,900,880 | * | 5/1999 | Cline et al. ........................... 345/423 |

OTHER PUBLICATIONS

Lorensen ("Geometric Clipping using Boolean Textures"): IEEE1993: ISBN:0–8186–3940–7.*

* cited by examiner

Primary Examiner—Mark Zimmerman
Assistant Examiner—Mano Padmanabhan
(74) Attorney, Agent, or Firm—Sterne, Kessler, Goldstein & Fox PLLC

(57) ABSTRACT

A texture procedure allows the rendering of curve bounded objects to a graphics display device directly from a high level curve-based description. The method comprises receiving a curve-based description of the graphics object and dividing the graphics object into a rectangular mesh of texels. Each texel is then detailed by defining a combination of curved geometry functions and a boolean function. These function are then evaluated for each pixel of the graphics display device thereby rendering the graphics object to a graphics display. The texture procedure features include being procedural based and not image-based. This allows a rendering with continued accuracy even under arbitrary magnification conditions. Furthermore, the texture procedure is defined as such that will allow it to function using conventional tri-linear interpolation hardware.

15 Claims, 16 Drawing Sheets

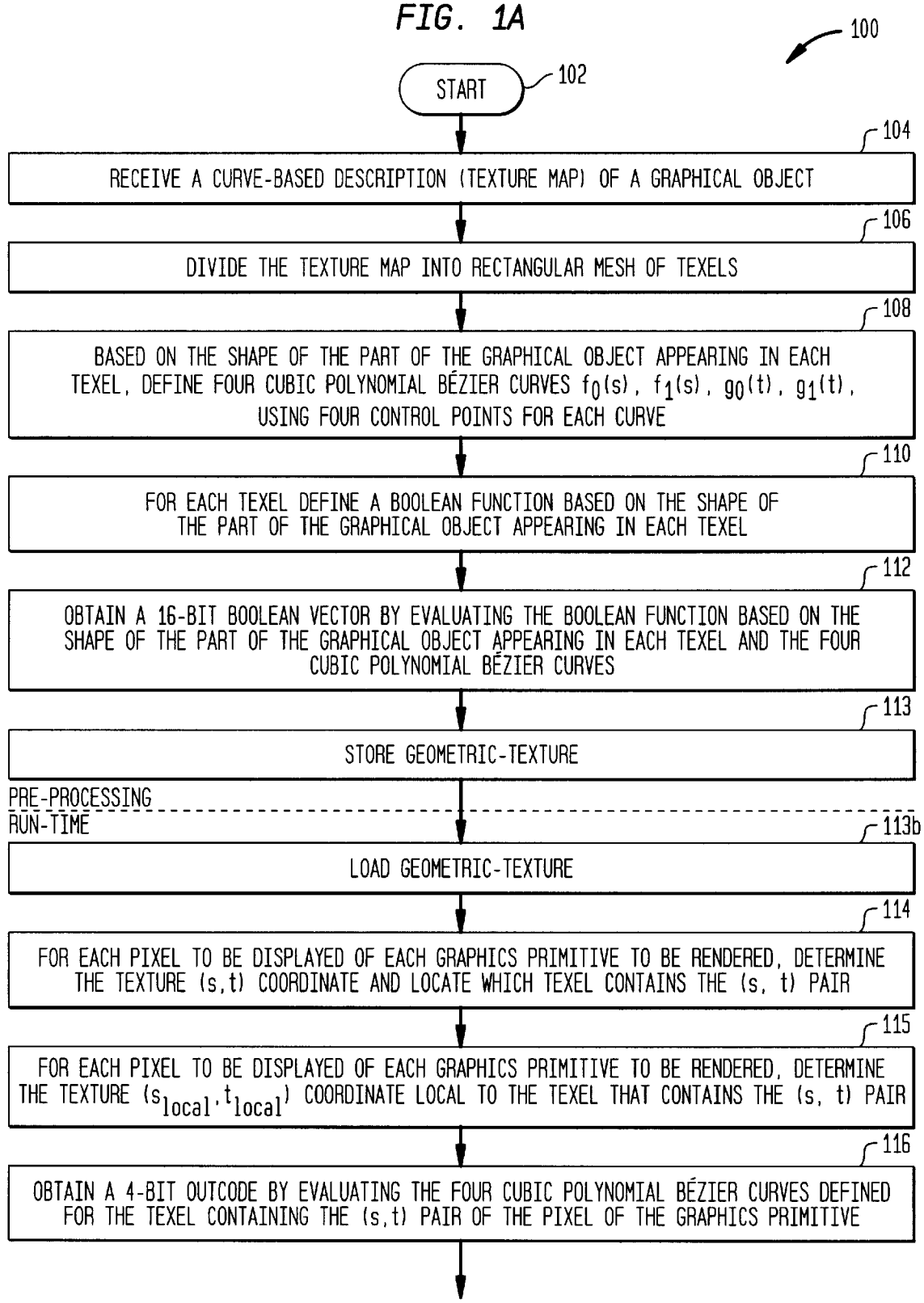

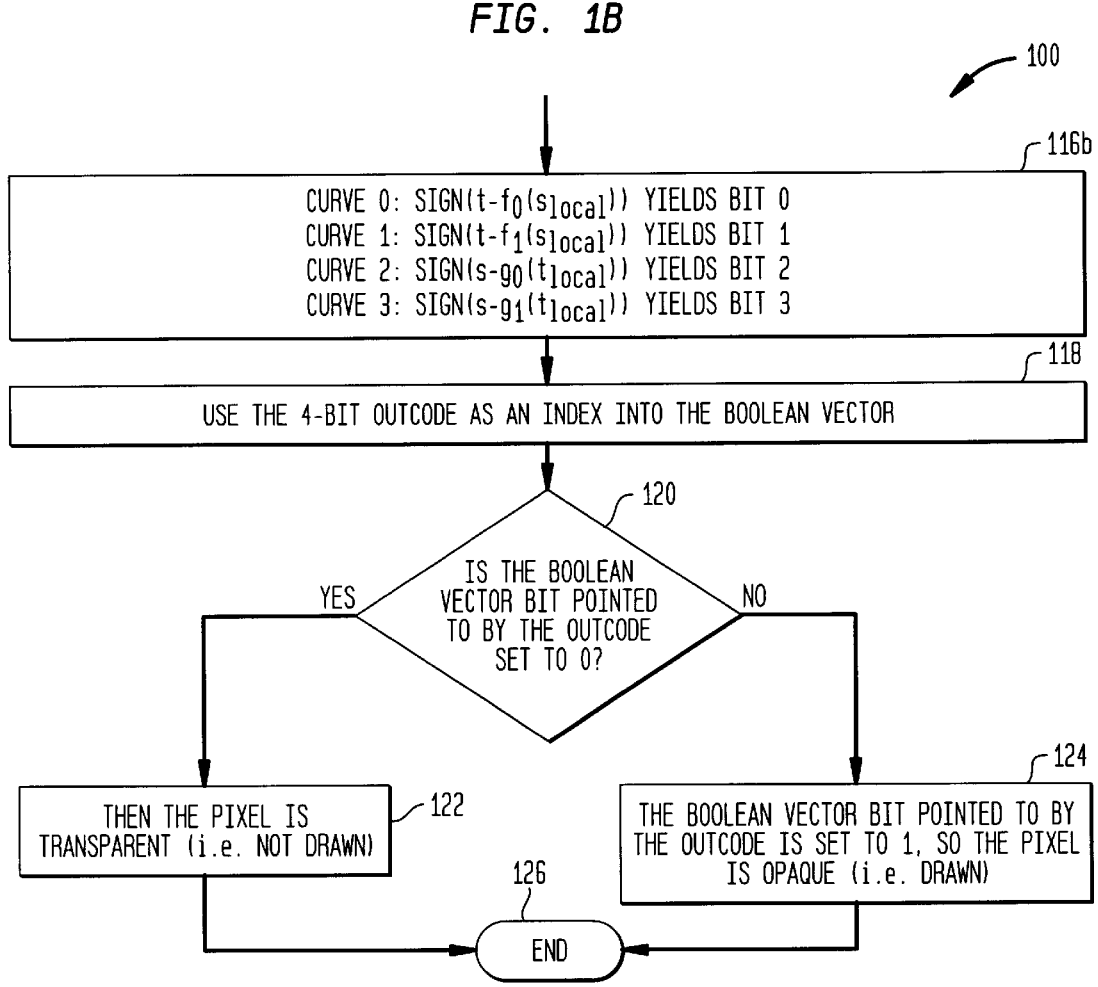

FIG. 12
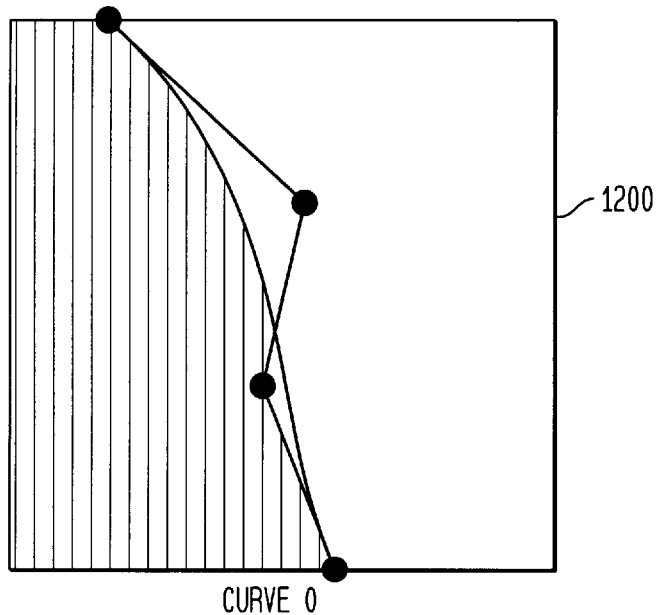
CURVE 0
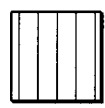 IF IN THIS REGION THEN BIT 0 IS SET (1).
FIG. 13
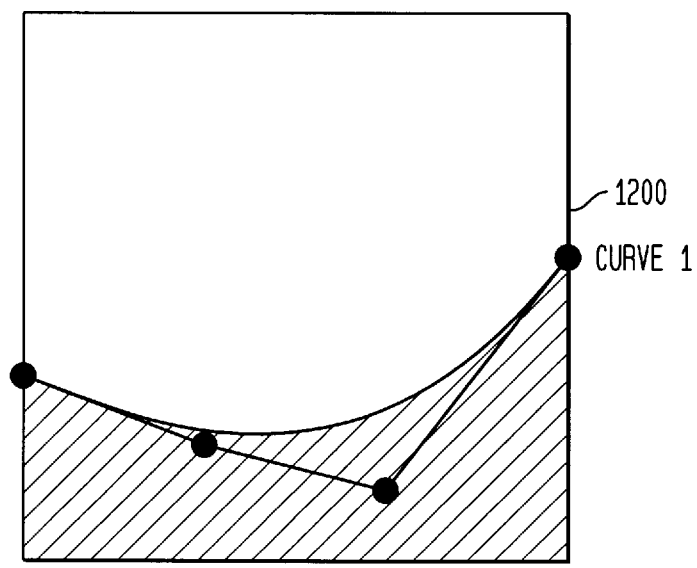
CURVE 1
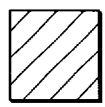 IF IN THIS REGION THEN BIT 1 IS SET (1).

FIG. 14
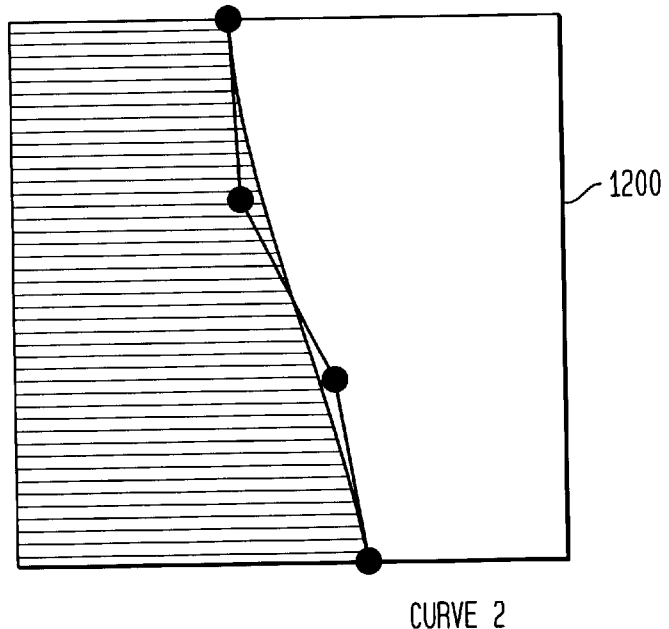
CURVE 2
 IF IN THIS REGION THEN BIT 2 IS SET (1).
FIG. 15
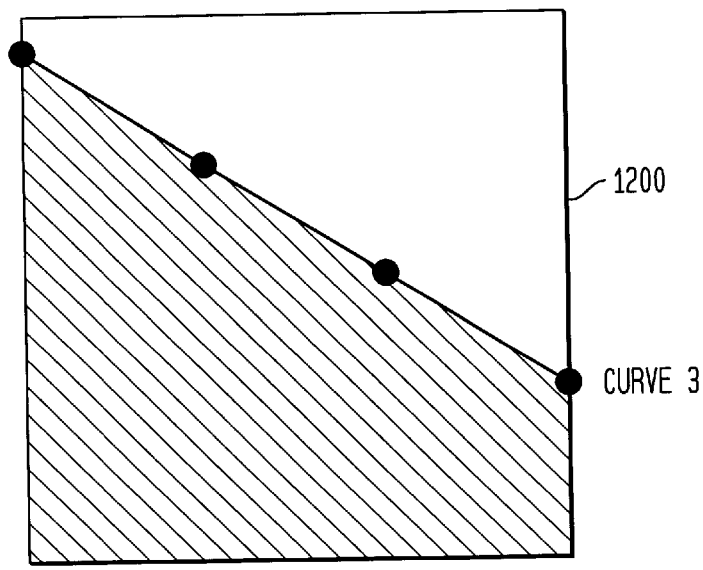
CURVE 3
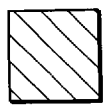 IF IN THIS REGION THEN BIT 3 IS SET (1).

ORIGINAL TEXTURE

PRE-FILTERED VERSIONS OF THE TEXTURE

TEXTURE HIERARCHY

ADJACENT LEVELS OF DETAIL IN THE TEXTURE HIERARCHY. THE FOUR TEXELS IN EACH TEXTURE ARE BILINEARLY BLENDED. THESE ARE WEIGHTED ACCORDING TO THE LOCATION WITHIN EACH TEXTURE OF THE PIXEL'S CENTER (s,t).

TRI-LINEARLY BLENDED TEXELS FOR A FINAL TEXTURE VALUE

SYSTEM AND METHOD FOR THE DIRECT RENDERING OF CURVE BOUNDED OBJECTS

BACKGROUND OF THE INVENTION

1. Field of the Invention

The present invention relates generally to computer graphics, and more particularly to a texture procedure for rendering curved bounded images on a graphics display device.

2. Related Art

A typical computer generated image of a curve bounded object utilizes a number of line segments to approximate the curved boundary. A pixel is a picture element of a graphics display device. Each pixel may represent unique attributes such as color, lighting, texture, etc. As is well known in the relevant art(s), texture procedures may be used to provide visual detail for displayed graphical objects. In a line segment technique, the more line segments used in the representation, the greater accuracy the ultimate display may contain. Each segment may contribute to one or more pixels of the final image. However, the number of line segments that can be used to render a display of a curved bounded region is limited. It is limited by the resolution of the intended graphics display device as well as the available memory space on the computer system. Furthermore, the more line segments used, the greater will be the calculation time, and thus the rendering time.

Conventional textures are image-based and composed of texels, which taken collectively form an image. A polygon is rendered with a mapping specified between the polygon's vertices and the texture. This mapping is usually specified in texture coordinates (s, t). When the polygon is rendered into pixels, the texture coordinates of each pixel are determined and used to lookup a value in the texture that is used in the drawing of the pixel. This value may be color, transparency, etc. Other conventional methods for rendering curved bounded regions have attempted various polygonal approximations and other incremental methods that result in the same limitations described above with respect to line segment techniques. Therefore, what is needed is a texture procedure for rendering curved based objects without the need to convert the graphics object into line segments or perform any type of tessellation.

SUMMARY OF THE INVENTION

The present invention is a system and method for rendering a curve bounded object to a graphics display device directly from a high level curve-based description. The method includes receiving a curve-based description of the graphics object (e.g., character typeface) and dividing the graphics object into a rectangular mesh of texels. Each texel is detailed by defining a combination of curved geometry functions and a boolean function. Each texel contains a miniature resolution independent image of bounded complexity. Taken collectively, the texels form a continuous or resolution independent binary image. The result of the above steps transforms the graphics object into a geometric-texture. The method of the present invention, for each pixel to be displayed, then determines the Cartesian (s, t) coordinate pair within the geometric-texture. The curved geometry functions and the boolean function defined for the texel containing the (s, t) pair are then evaluated. This step is repeated for each (s, t) pair of each pixel of each polygon to be rendered. The result is an alpha value or color for each pixel and thus the display of the curve bounded object to a graphics display device.

In a preferred embodiment, the method of the present invention utilizes two horizontal axis functions, $f_0(s)$ and $f_1(s)$, and two vertical axis functions, $g_0(t)$ and $g_1(t)$, within each texel in creating the curved geometries.

One advantage of the present invention is that unlike conventional methods that used image-based textures, the invention uses procedural textures that have no inherent resolution and will remain accurate when subject to arbitrary magnification.

Another advantage of the present invention is that the method can be performed using conventional tri-linear interpolation hardware when the curved geometry functions defined for each texel are cubic polynomials.

Another advantage of the present invention is that the method may also be used to implement a class of procedural alpha texture for selectively drawing (trimming) graphic primitives.

BRIEF DESCRIPTION OF THE FIGURES

The present invention will be described with reference to the accompanying drawings, wherein:

FIGS. 1A and 1B are a flowchart representing the overall preferred operation of the present invention;

FIG. 12 is an illustration of a texel containing a Bézier curve, $g_0(t)$, defined as a function of the vertical axis according to the present invention;

FIG. 13 is an illustration of a texel containing a Bézier curve, $f_0(s)$, defined as a function of the horizontal axis according to the present invention;

FIG. 14 is an illustration of a texel containing a Bézier curve, $g_1(t)$, defined as a function of the vertical axis according to the present invention;

FIG. 15 is an illustration of a texel containing a Bézier curve, $f_1(s)$, defined as a function of the horizontal axis according to the present invention;

DETAILED DESCRIPTION OF THE PREFERRED EMBODIMENTS

Overview

The present invention relates to a texture procedure that uses conventional tri-linear interpolation hardware to compute whether a pixel is inside or outside a curved region. The method can be used to quickly render characters (e.g., PostScript™ typefaces) directly from curved based descriptions.

The present invention is described in terms of a character-rendering example. This is for convenience only and is not intended to limit the application of the present invention. In fact, after reading the following description, it will be apparent to one skilled in the relevant art how to implement the following invention in alternative embodiments (e.g., to implement a class of procedural alpha texture for selectively trimming graphic primitives).

Referring to FIGS. 1A and 1B, texture procedure 100 illustrates the overall operation of the present invention. Texture procedure 100 begins at step 102 with control passing immediately to step 104. In step 104, a computer stored (either digitized or synthesized) curve-based description of a curve bounded object is received and converted into a texture map. For example, a PostScript™ font (character) might be received. They are defined by curves and straight lines. The texture map is then divided into a rectangular mesh of regions known as texels in a step 106. Next, in a step 108, the interior of each texel, based on the shape of part of the curve bounded object appearing in the texel, is detailed by defining up to four Bézier curves. Use of the Bézier formulation for constructing curves to display curved bounded regions (surfaces) is well known in the relevant art. See Hearn, Donald and Baker, M. Pauline, *Computer Graphics*, (Prentice-Hall: USA 1986) pp. 195–98, which is incorporated herein by reference in its entirety.

Figure 2:
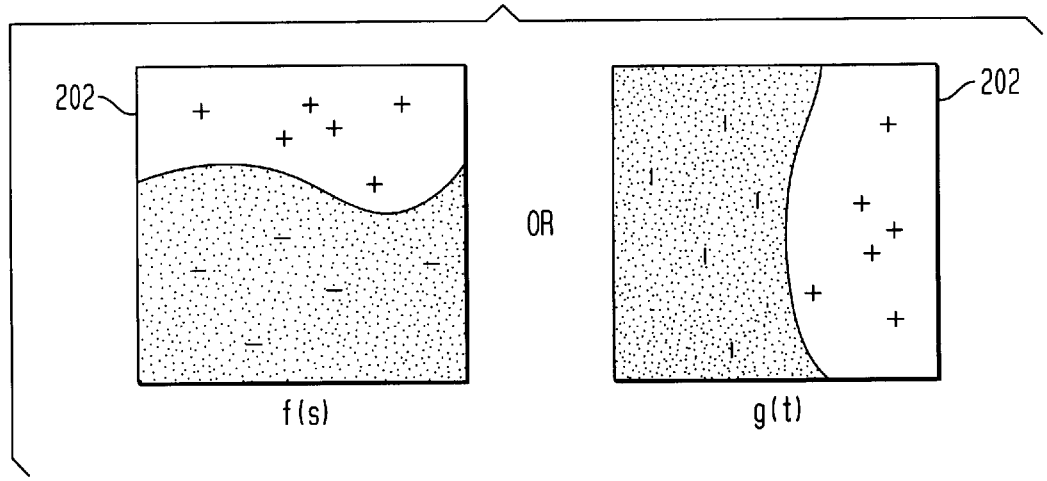
FIG. 2 is an illustration of how Bézier curves divide a texel according to the present invention.

The four Bézier curves are two functions, $f_0(s)$ and $f_1(s)$, of the horizontal axis (s), and two functions, $g_0(t)$ and $g_1(t)$, of the vertical axis (t). In a preferred embodiment, each of the four functions are defined using the Bézier formulation with four control points, $P_0$, $P_1$, $P_2$ and $P_3$, as will be explained in detail below with reference to FIGS. 8–15). This process results in four cubic polynomial functions that display (approximately) the desired curved object. Each of these curves divides the texel into two regions, plus (+/0) and minus (−/1) (as shown in FIG. 2 with reference to a texel 202). The plus region is above or to the right of the curve, whereas the minus region is below or to the left of the curve.

In addition to the four Bézier functions, each texel is also defined, in step 110, by a boolean function based on the shape appearing in each texel and the four Bézier curves. In step 112, a 16-bit boolean vector is then obtained by evaluating the boolean function (defined in step 110) based on the shape of the part of the curve bounded object appearing in each texel and the four cubic polynomial Bézier functions (defined in step 108).

In step 113, the resultant geometric-texture is stored (on a host computer memory as will be explained below with reference to FIG. 5). Steps 102 to 113 can be part of a preprocessing procedure for a set of characters (e.g., a PostScript™ font). Once created and stored, the geometric textures can be loaded into memory at run-time (step 113*b*) for continuation of the texture procedure 100. The geometric-texture is used to draw a polygon that allows the curved object, defined by the geometric-texture, to be drawn. Because the geometric-texture of the present invention behaves like a conventional texture, many polygons could be used to draw the object, possibly mapping it onto a three-dimensional object.

Figure 3:
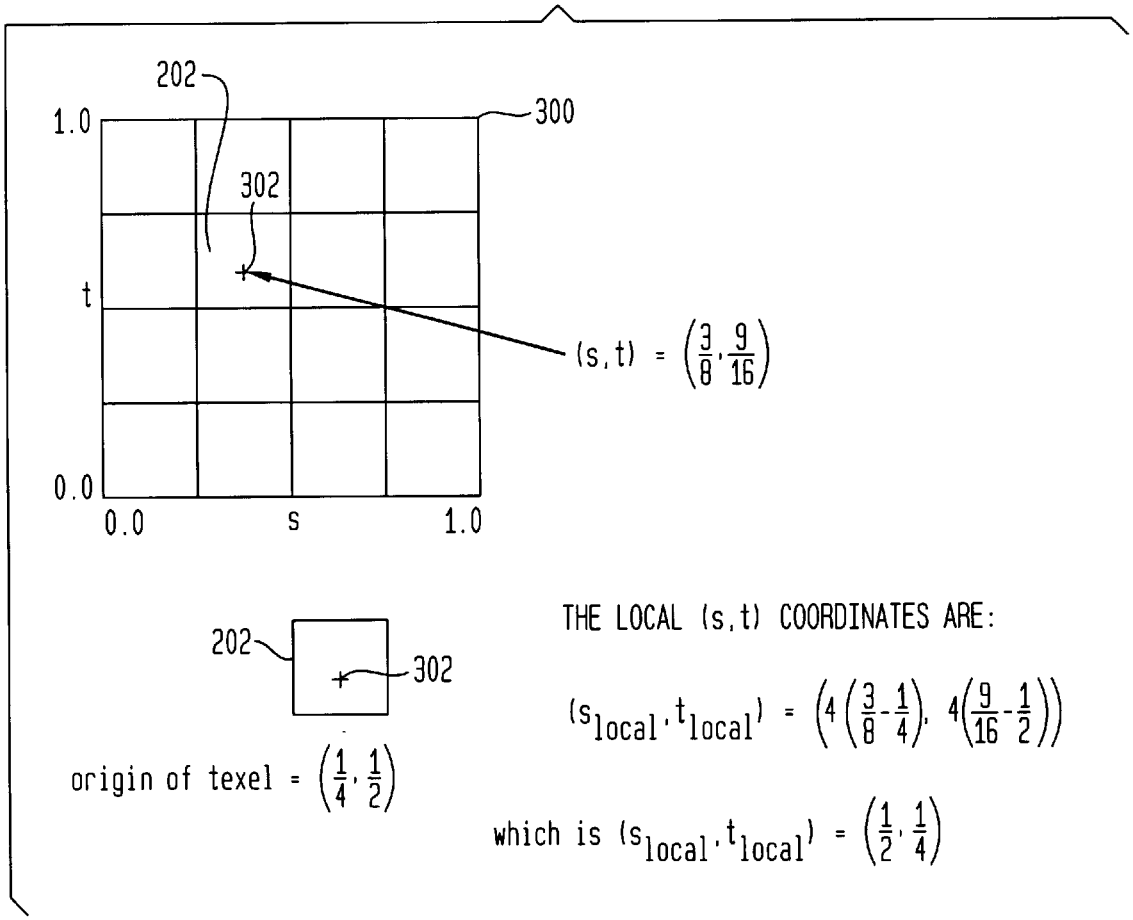
FIG. 3 is an illustration of how a texel is located within a texture according to the present invention.

At run-time processing, for each pixel to be displayed of each graphics primitive (i.e. polygon) to be rendered using the geometric-texture, the texture (s, t) coordinate pair is determined (step 114). This is done using any form of conventional interpolation. Then, the texel into which the (s, t) pair falls is located. In step 115, the texture ($s_{local}$, $t_{local}$) coordinate pair local to the texel must be computed. Since there are normally a $2^n$ number of texels in each dimension of the texture map, this computation is not costly. For example, step 114 and the computation of step 115 are illustrated in FIG. 3. FIG. 3 shows a texture map 300 divided into sixteen texels (4×4 array). The (s, t) coordinates within the texture 300 range from 0.0 to 1.0. Thus the coordinates of any pixel within the texture map 300 will be expressed in as a (s, t) pair where s and t are fractions. A pixel 302 is first located within the texture map 300. Its (s, t) coordinate pair, relative to texture 300, is (⅜, 9/16). This completes step 114.

In step 115, a local ($s_{local}$, $t_{local}$) coordinate pair of pixel 302, relative to texel 202, is computed. Texel 202 has an origin whose (s, t) coordinate pair is (¼, ½). The origin is simply the (s, t) coordinate pair, relative to texture 300, of the bottom left corner of the texel 202. Then, the ($s_{local}$, $t_{local}$) coordinate pair of pixel 302 is computed as follows:

$$(s_{local}, t_{local}) = (j*(s - s_{origin}), k*(t - t_{origin}))$$

where j and k are the number of texels which divide texture map 300 in the s and t direction respectively. In FIG. 3, the result of the above calculation is an ($s_{local}$, $t_{local}$) coordinate pair of (½, ¼) for pixel 302.

In step 116, for each ($s_{local}$, $t_{local}$) pair, the four functions of the texel where the (s, t) pair lies are evaluated in parallel. As will be explained below (with reference to FIGS. 17–24), these four evaluations may use the same hardware that is required for tri-linear mapped textures. The difference between each function and the opposing texture coordinate is used to determine whether the ($s_{local}$, $t_{local}$) pair is in the plus (+/0) or minus (−/1) region. The evaluations are illustrated in step 116*b* as follows:

Curve 0: sign(t − $f_0(s_{local})$) yields Bit 0
Curve 1: sign(t − $f_1(s_{local})$) yields Bit 1
Curve 2: sign(s − $g_0(t_{local})$) yields Bit 2
Curve 3: sign(s − $g_1(t_{local})$) yields Bit 3

The resultant 4-bit "outcode" (bits 0–3 concatenated), corresponds to the ($s_{local}$, $t_{local}$) coordinate pair's relationship with the plus or minus regions with respect to each curve. The outcode is then used as an index into the boolean vector (step 118) (as will be further explained below with reference to FIG. 16). Step 120 can then determine, for example, the alpha value or "in" or "out" for each ($s_{local}$, $t_{local}$) pair. If the boolean vector bit pointed to by the outcode is set to 0, then the pixel is transparent (step 122). Alternatively, if the boolean vector bit pointed to by the outcode is set to 1, the pixel is opaque (step 124). Steps 114–124 are thus repeated for every pixel to be displayed of each geometric-texture to be rendered (this recursion is not shown in FIGS 1A and 1B). The process is thus completed, as indicated by step 126, when the entire curve bounded object is rendered to the graphics display device pixel by pixel.

Figure 4:
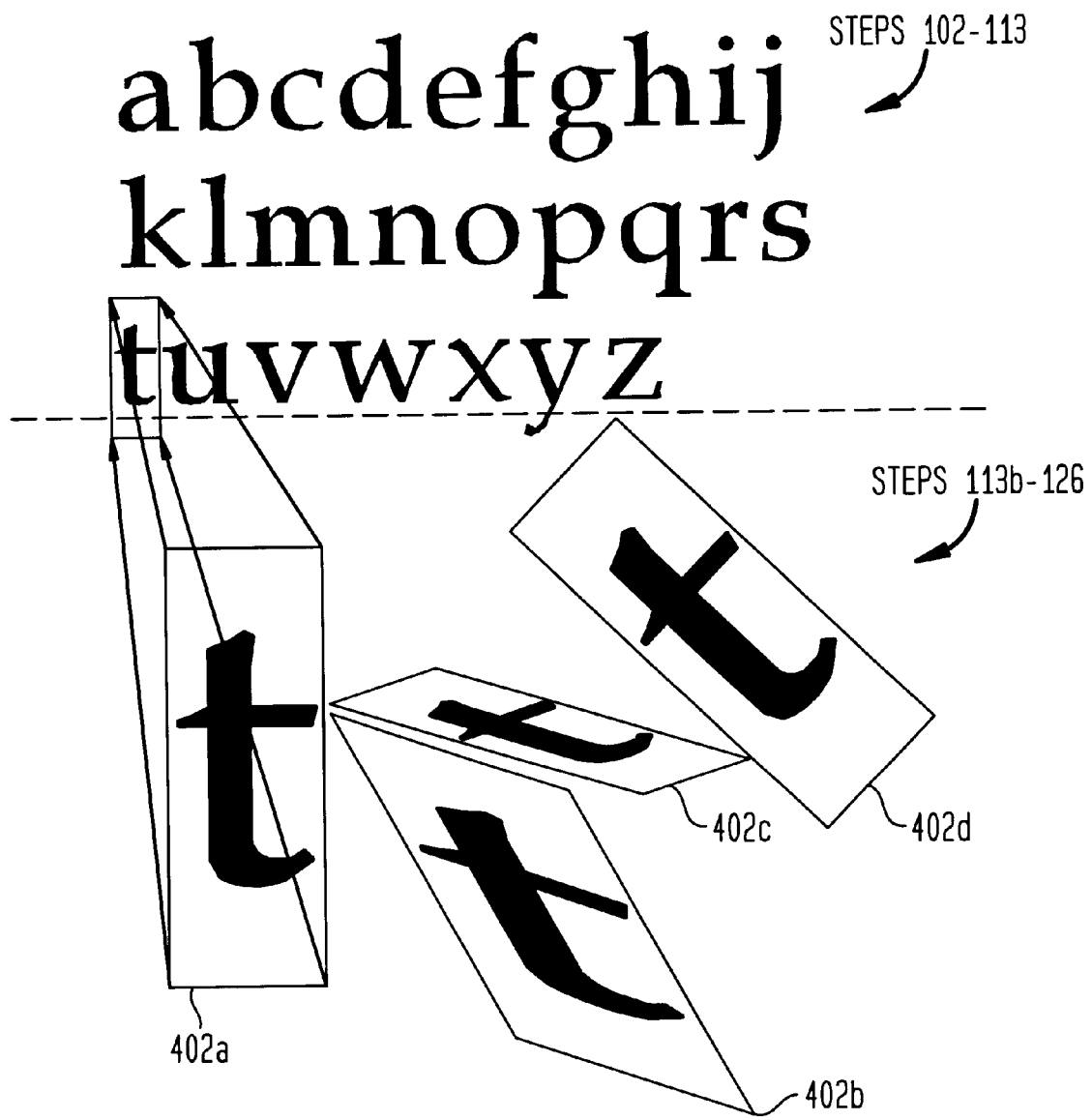
FIG. 4 illustrates an example of the preprocessing and run-time transformations according to the present invention.

The run-time processing steps of 113*b* to 126 can be repeated any number of times to produce different transformations of the geometric-texture. The texture procedure 100 is illustrated for a set of characters in FIG. 4. FIG. 4 shows the division between preprocessing (steps 102 to 113) and run-time processing (steps 113*b* to 126). In the case of drawing a character, the polygon normally specifies (s, t) coordinates that completely surround the character to be drawn. The recursion mentioned above would thus be performed for each (s, t) coordinate pair of the polygon's pixels. By applying transformations to the polygon (only four points) the entire character is transformed. In FIG. 4, an entire alphabet and a polygon with the mapping into the geometric-texture is defined. The polygon can then be drawn several times by applying different transformations, according to the present invention, that result in four different renderings 402*a*–402*d*.

Furthermore, it is important to note that the result of texture procedure 100 (as shown in FIGS. 1A and 1B) is a single number (a zero or a one). Therefore, it will be apparent to one skilled in the relevant art how to implement the method of the present invention to use the result for various purposes (e.g., color) other than transparency.

Environment

Figure 5:
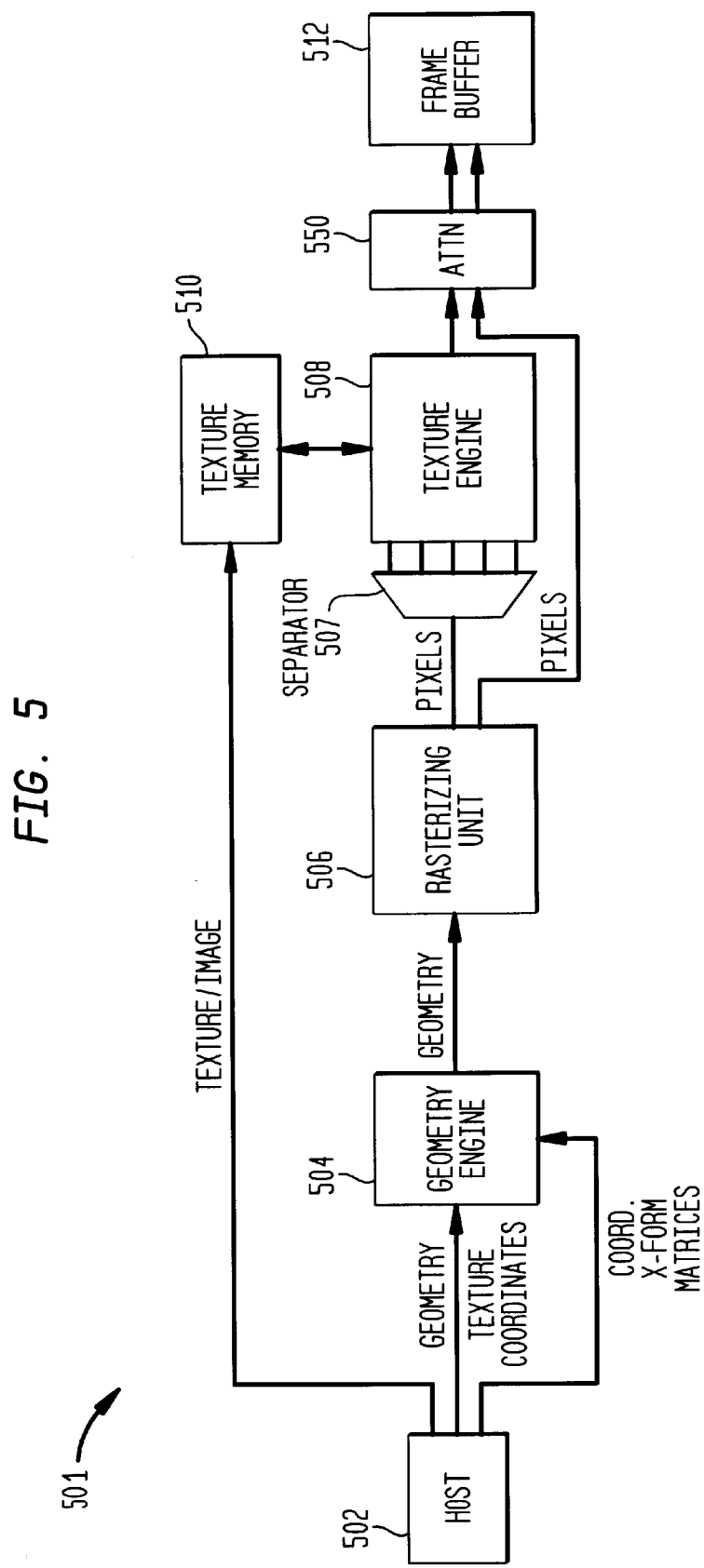
FIG. 5 is a block diagram of an exemplary computer system useful for implementing the present invention.

FIG. 5 is a block diagram of an exemplary computer imaging system 501 useful for implementing the present invention. Computer imaging system 501 includes a host computer 502, geometry engine 504, rasterizing unit 506, texture engine 508, texture memory 510, attenuation unit 550, and frame buffer 512. Imaging system 501 further includes a separator unit 507. Steps 106–120 are carried out in texture engine 508 and can be implemented in software, firmware, and/or hardware in one or more processing components. Steps 122–124 would take place on frame buffer 512. For example, any host or graphics processor can be used to implement texture procedure 100 in software running on a processor(s). In the example of FIG. 5, host 502 can implement step 114 by controlling pixels passed to separator unit 507. Separator unit 507 can be any type of processing logic (or program code executing on host 502).

The present invention is described in terms of an example computer graphics processing environment. As described herein, the present invention can be implemented as software, firmware, hardware, or any combination thereof.

Given the description herein, it would be apparent to one skilled in the art to implement the present invention in any computer graphics application, API, or any other system that supports a texture engine including, but not limited to, a computer graphics processor (single chip or multiple chips), high-end to low-end graphics workstations, gaming platforms, systems and consoles.

Description in these terms is provided for convenience only. It is not intended that the invention be limited to application in this example environment. In fact, after reading the following description, it will become apparent to a person skilled in the relevant art how to implement the invention in alternative environments.

The present invention can be implemented using software running (that is, executing) in an environment similar to that described above. In this document, the term "computer program product" is used to generally refer to a removable storage unit or a hard disk installed in a hard disk drive. These computer program products are means for providing software to a computer system (e.g., host 502).

Computer programs (also called computer control logic) are stored in main memory and/or secondary memory. Computer programs can also be received via a communications interface. Such computer programs, when executed, enable the computer system to perform the features of the present invention as discussed herein. In particular, the computer programs, when executed, enable a processor to perform the features of the present invention. Accordingly, such computer programs represent controllers of a computer system.

In an embodiment where the invention is implemented using software, the software may be stored in a computer program product and loaded into a computer system using a removable storage drive, hard drive, or communications interface . Alternatively, the computer program product may be downloaded to computer system over a communications path. The control logic (software), when executed by a processor, causes the processor to perform the functions of the invention as described herein.

In another embodiment, the invention is implemented primarily in firmware and/or hardware using, for example, hardware components such as application specific integrated circuits (ASICs). Implementation of a hardware state machine to perform the functions described herein will be apparent to persons skilled in the relevant art(s).

Detailed Example of Texture Procedure 100

Figure 6:
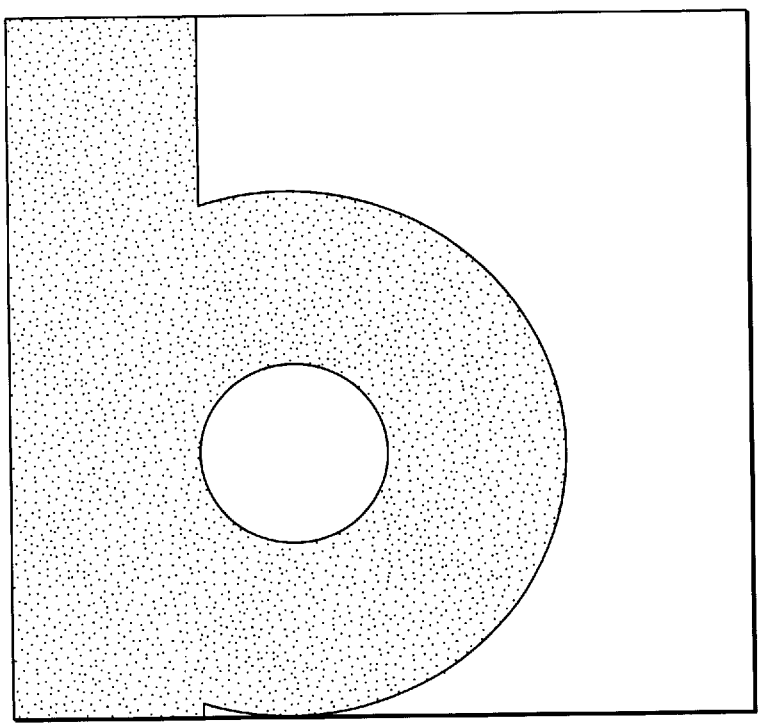
FIG. 6 is an illustration of a texture map on which the present invention would operate.

FIG. 6 is an illustration of a texture map 600 on which the present invention would operate. In a preferred embodiment, the method of the present invention to directly render curve bounded objects would be used to render characters (e.g., PostScript™ typefaces). Accordingly texture map 600 is a computer stored image of the lowercase letter "b".

Figure 7:
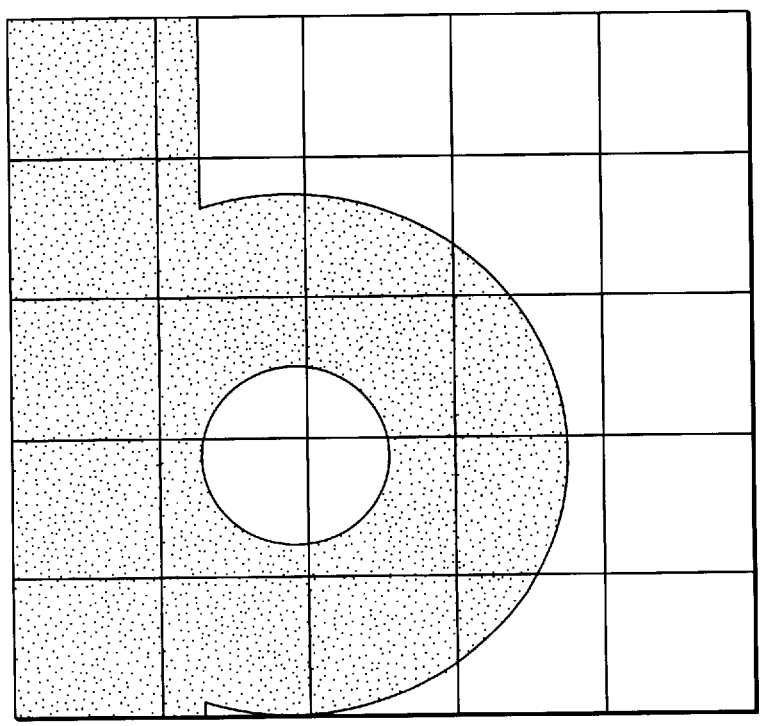
FIG. 7 is an illustration of a texture map divided into several texels according to the present invention.

FIG. 7 is an illustration of texture map 600 divided into a rectangular mesh of regions known as texels. Although FIG. 6 shows texture map 600 divided into 25 texels (5×5 rectangular grid), it should be understood that this is presented as an example and not a limitation. For reasons that will become clear, the method of the present invention allows texture map 600 to be divided into a lesser number of texels than those needed by conventional texture resolution methods.

Figure 8:
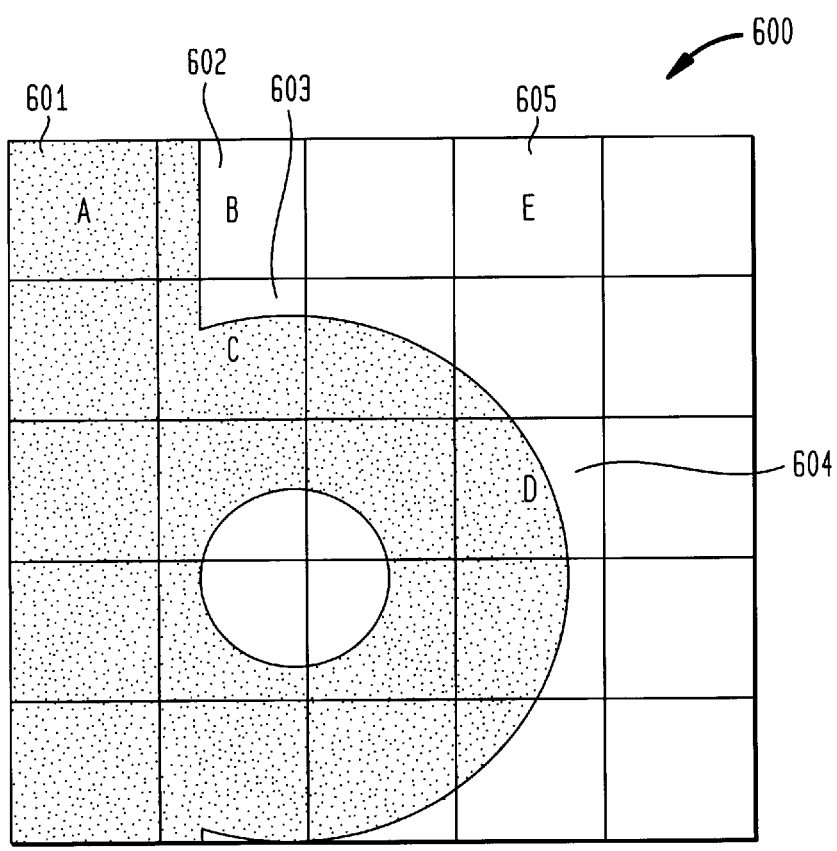
FIG. 8 is an illustration of a texture map divided into several labeled texels according to the present invention.

FIG. 8 is an illustration of texture map 600 divided into texels as shown in FIG. 7. However, in FIG. 8, five texels 601–605 have been labeled "A" through "E", respectively, for purposes of the following explanation of a preferred embodiment of the present invention.

Figure 9:
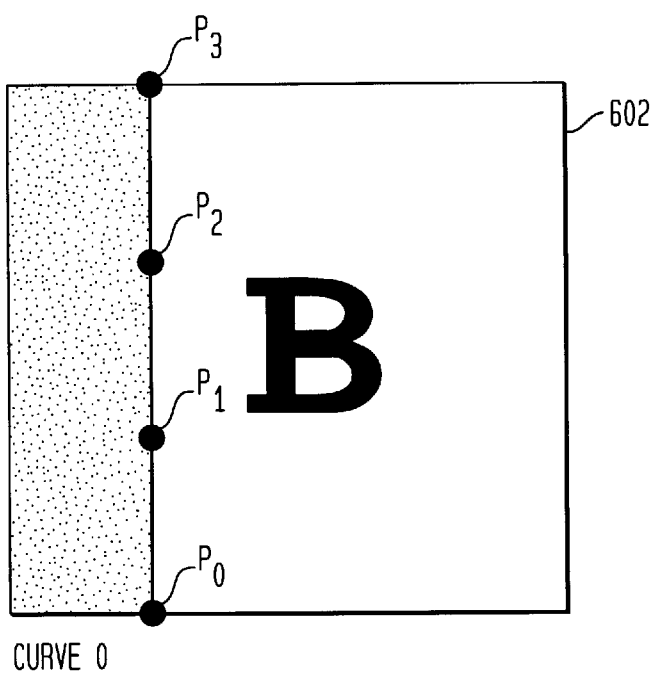
FIG. 9 is an illustration of one texel of a texture map containing one curve according to the present invention.

FIG. 9 is a detailed illustration of texel 602 (labeled "B") of texture map 600. The shape appearing in texel 602, which is simply the part of the lowercase letter "b" of FIG. 7 that falls into texel 602, defines one Bézier curve 0. Curve 0 is defined through the Bézier formulation using four control points $P_0$, $P_1$, $P_2$ and $P_3$. This curve is simply a function of the vertical axis (t). Thus, the 16-bit boolean vector would contain half ones corresponding to the Bézier curve 0. The boolean vector would thus be:

0101010101010101

Figure 10:
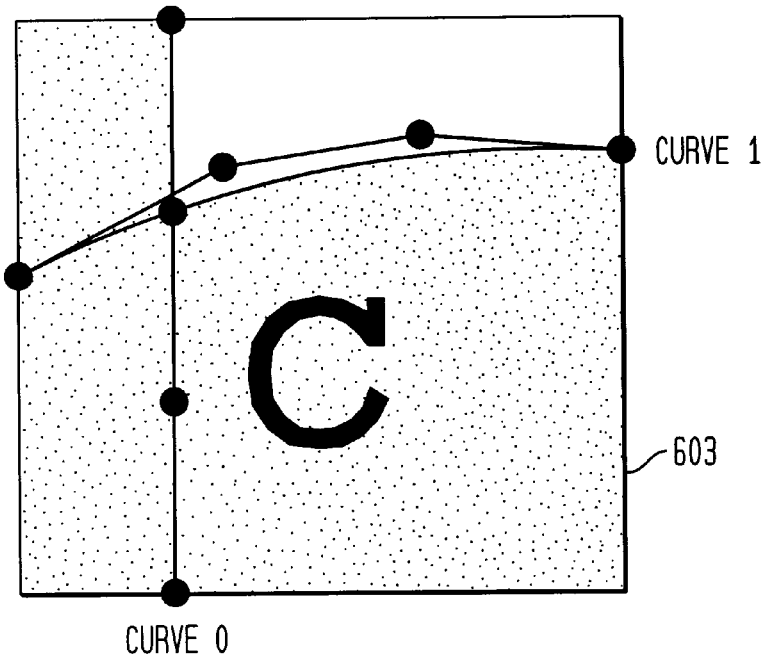
FIG. 10 is an illustration of one texel of a texture map containing two curves according to the present invention.

FIG. 10 is a detailed illustration of texel 603 (labeled "C") of texture map 600. The shape appearing in texel 603, which is simply the part of the lowercase letter "b" of FIG. 7 that falls into texel 603, defines two Bézier curves 0 and 1. Bézier curve 0 is simply a function of the vertical axis (t) as in texel 602. Bézier curve 1 is a function of the horizontal axis (s). Thus, the 16-bit boolean vector reflects the union of the two half spaces of Bézier curves 0 and 1. The boolean vector would thus be:

Curve 1: 1100110011001100

Curve 0: 1010101010101010

Boolean Function=curve 0 V curve 1

Boolean Vector=1110111011101110

Figure 11:
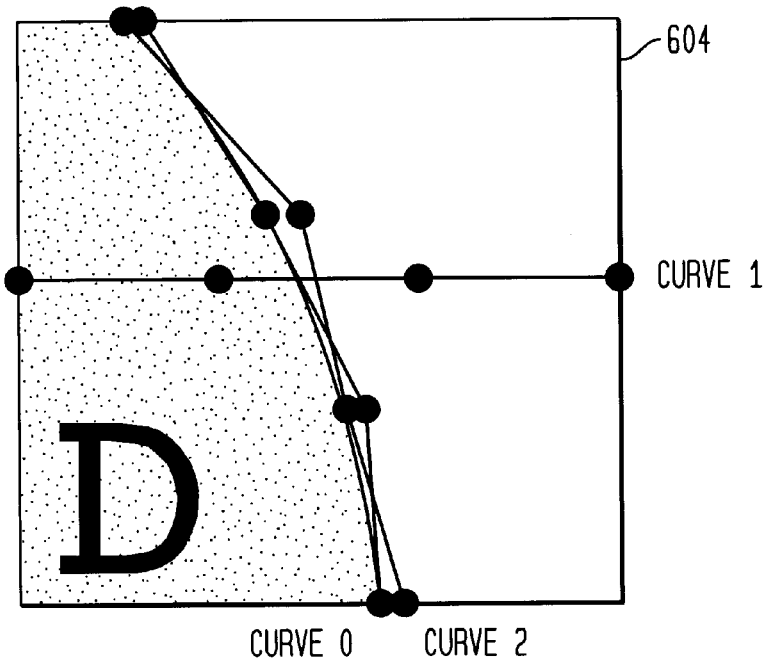
FIG. 11 is an illustration of one texel of a texture map containing three curves according to the present invention.

FIG. 11 is a detailed illustration of texel 604 of (labeled "D") of texture map 600. The shape appearing in texel 604, which is simply the part of the lowercase letter "b" of FIG. 7 that falls into texel 604, defines three Bézier curves 0, 1 and 2. Two Bézier curves are function of the vertical axis (t) and one is a function of the horizontal axis (s). The boolean vector is such that the vertical curves are split by the horizontal curve. The boolean vector would thus be:

Curve 1: 1100110011001100
Curve 0: 1010101010101010
Curve 2: 1111000011110000
Boolean Function $_{(curve0 \wedge curve1) V (curve2 \wedge \overline{curve1})}$
Boolean Vector=1011100010111000

Referring to FIG. 8, it can be seen that texel 601 (labeled "A") has no curves defined as all the pixels within the texel need to be filled during rendering. Thus, no matter what curves are evaluated, according to the present invention, the result would always be a logical 1 (i.e. inside the curve). Thus the boolean vector for such a texel is all TRUE ("1"s). Still referring to FIG. 8, texel 605 (labeled "E") also contains no curves defined. Because no pixels within the texel need to be filled during rendering, no matter what curves are evaluated, according to the present invention, the result would always be a logical 0 (i.e. outside the curve). Thus the boolean vector for such a texel is all FALSE ("0"s).

Now referring to FIG. 12, a detailed illustration of a texel 900 containing a Bézier curve 0 defined as a function of the vertical axis, $g_0(t)$ is shown. If a $(s_{local}, t_{local})$ coordinate pair evaluates in the shaded region, then bit 0 is set to logical TRUE ("1").

FIG. 13 is an illustration of texel 1200 containing a Bézier curve 1 defined as a function of the horizontal axis, $f_0(s)$. If a $(s_{local}, t_{local})$ coordinate pair evaluates in the shaded region, then bit 1 is set to logical TRUE ("1").

FIG. 14 is an illustration of texel 1200 containing a Bézier curve 2 defined as a function of the vertical axis, $g_1(t)$. If a $(s_{local}, t_{local})$ coordinate pair evaluates in the shaded region, then bit 2 is set to logical TRUE ("1").

FIG. 15 is an illustration of texel 1200 containing a Bézier curve 3, defined as a function of the horizontal axis, $f_1(s)$. If a $(s_{local}, t_{local})$ coordinate pair evaluates in the shaded region, then bit 3 is set to logical TRUE ("1").

Figure 16:
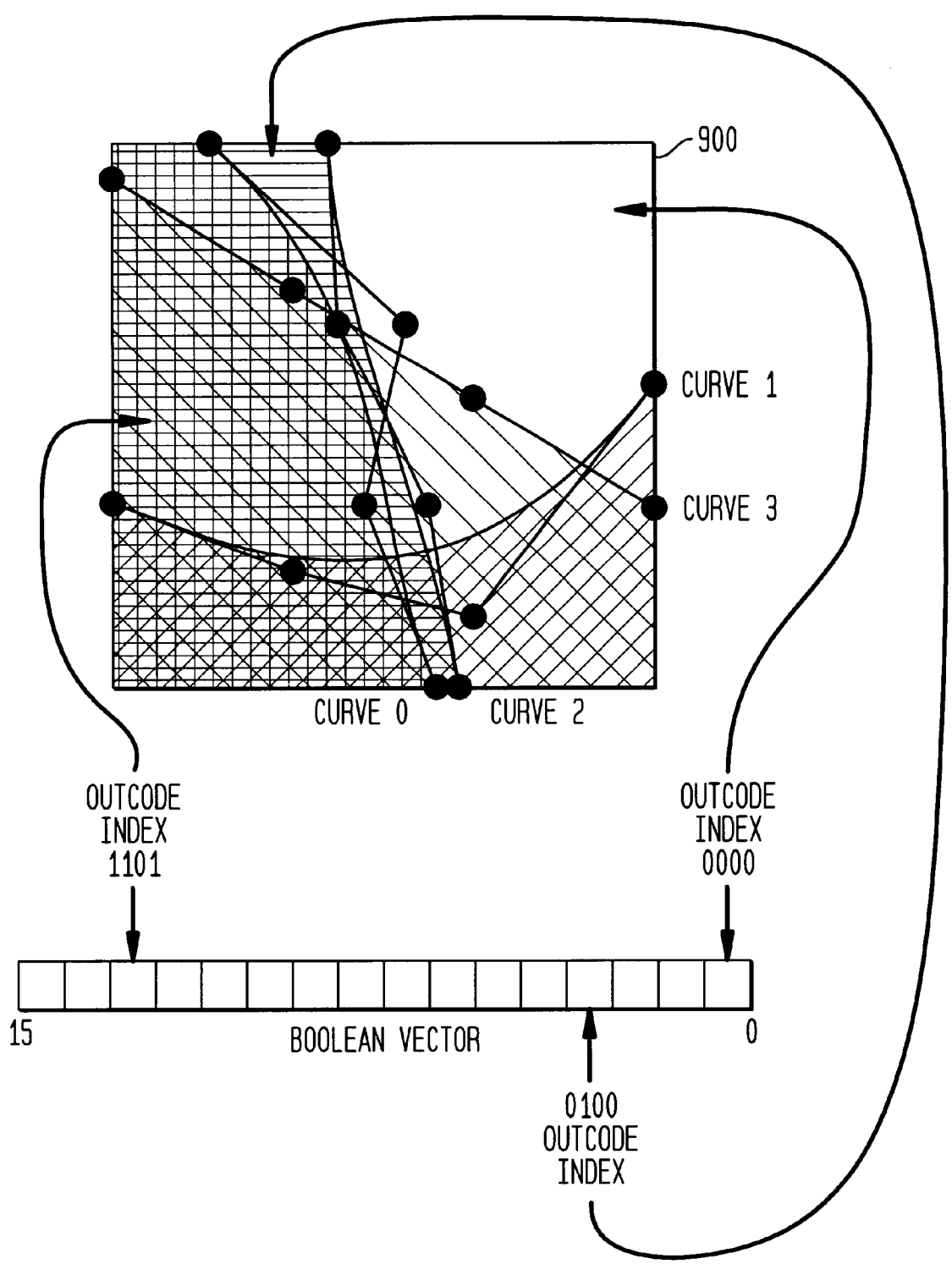
FIG. 16 is an illustration of a texel containing four Bézier curves and the mapping done according to the present invention.

Now referring to FIG. 16, texel 1200 is shown containing all four Bézier curves 0–3 (shown individually in FIG. 12–15 respectively). Also shown in FIG. 16 is the mapping done according to the present invention is illustrated. The resulting four bits (0–3) are concatenated to form a 4-bit outcode. The 4-bit outcode is then used as an index into the earlier evaluated 16-bit boolean vector for texel 1200 (see step 112 of FIG. 1A). The bit in the 16-bit boolean vector that corresponds to the 4-bit outcode is then used to render the pixel on the graphics display. The value read from the boolean vector is the alpha value for the pixel. More specifically, if the boolean vector bit pointed to by the outcode is set to 0, then the pixel is transparent. Alternatively, if the boolean vector bit pointed to by the outcode is set to 1, the pixel is opaque. In general, the boolean vector will contain $2^n$ bits for n curves in each texel. This is because each curve provides one bit of the index into the boolean vector.

Advantages of the Present Invention

An advantage to the above described texture procedure is that by modeling the part of the texture map that falls into each texel with four Bézier curves, more detail is modeled by each texel. Thus, a texture map can be divided into fewer texels thereby providing a very significant performance increase in rendering objects to graphics display devices.

Another advantage of the present invention is that conventional tri-linear interpolation hardware can be used to implement the texture procedure 100. Tri-linear interpolation, as is well known in the relevant art, is normally used to compute the weighted average of eight texels. This technique provides some rudimentary filtering. Tri-linear interpolation is briefly described to illustrate the analogy to the present invention that permits re-use of the tri-linear interpolation hardware for rendering curve bounded regions in accordance with the present invention.

Figure 17:
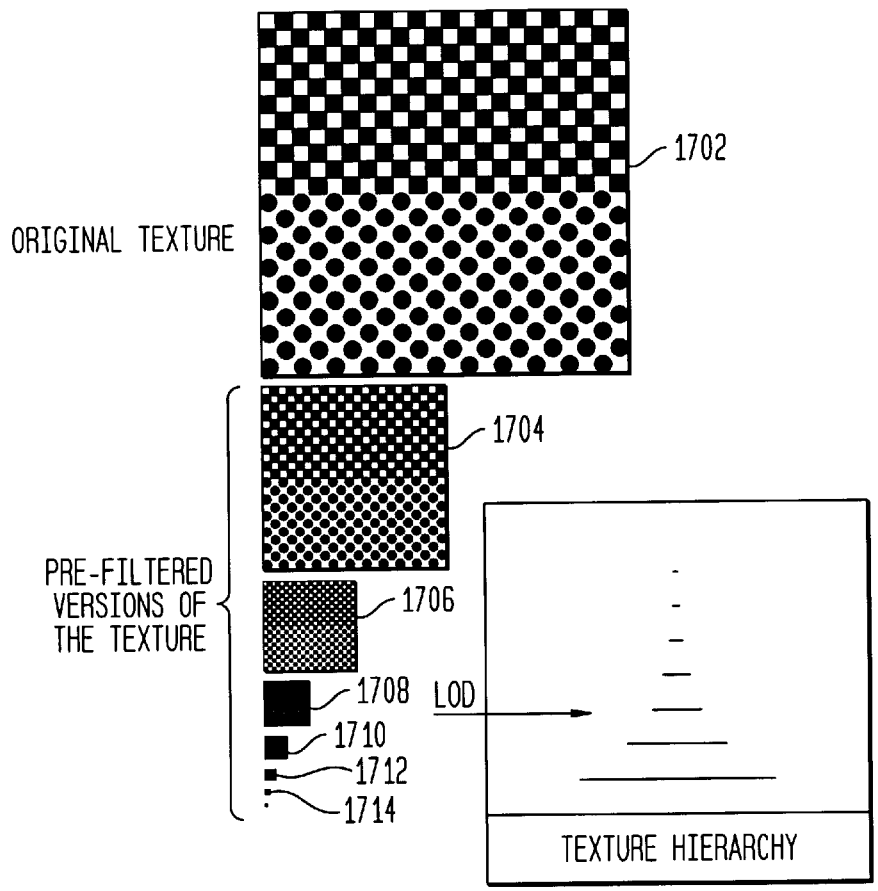
FIGS. 17–24 illustrate how the texture procedure of the present invention can be performed using conventional tri-linear interpolation hardware.

In standard tri-linear interpolation texture mapping, a texture map is stored in varying degrees of pre-filtering. For example, FIG. 17 shows a sample texture pattern 1702 and several pre-filtered or lower level of detail (LOD) versions 1704–1714 of the same map. Each of the lower LOD maps is one half the height and width of the next higher LOD map and is made by averaging together each group of four texels of the next higher LOD map. During a mapping operation, the size and shape of a pixel image mapped into the texture map is used to determine which level of detail (LOD) is appropriate for use in the texture mapping operation. Each LOD is useful for a different mapped pixel size.

Figure 18:
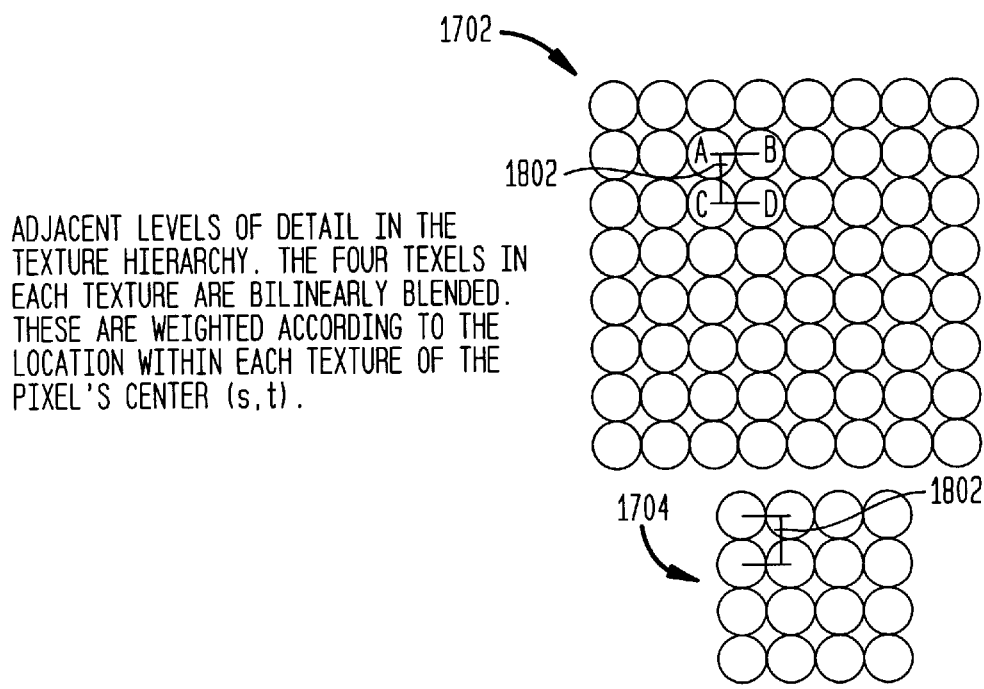

When a pixel size corresponds exactly to an existing LOD map (e.g., texture map 1702), the tri-linear interpolation operation simplifies to a bilinear interpolation. For example, to determine the contribution of the texels of LOD 1702 to the color of a display pixel on a display screen, the location of the pixel is mapped (i.e., transformed) to the texture map. The texture is then "sampled" at the exact point where the pixel center mapped into the texture map. However, because the pixel center may not coincide exactly with a texel value, a weighted average of the four nearest texel values is taken. This is illustrated in FIG. 18. The mapped pixel center is indicated at 1802. Note that pixel center 1802 falls between texel centers A, B, C and D of texture map 1702. One way to take the weighted average of these four texel values is by doing a bilinear interpolation (i.e., a linear interpolation in two dimensions).

Figure 19:
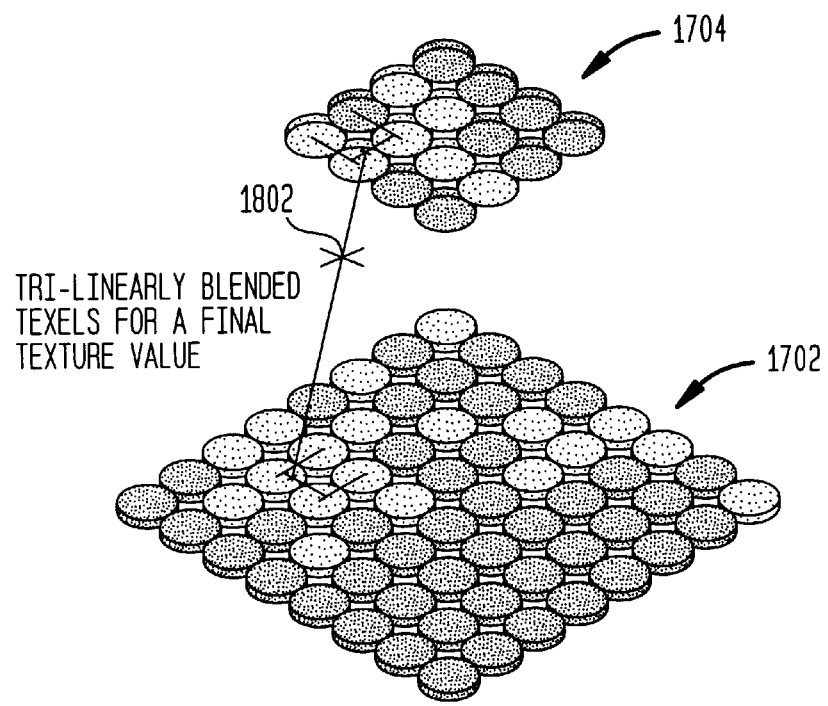

In the case where the pixel size does not correspond exactly to any existing LOD map, it will likely fall between two maps (e.g., texture maps 1702 and 1704). In this case, a bilinear interpolation is performed in both maps and a linear interpolation is used to blend the two results. The two bilinear interpolations followed by a linear interpolation yields a "tri-linear interpolation." For example, if the pixel size fall between a size corresponding to map 1702 and map 1704, then a bilinear interpolation operation would be performed in map 1702 as discussed above. In addition, a bilinear interpolation operation would be performed in map 1704 as shown in FIG. 18. The two resulting values would then be linearly blended based on the actual pixel size relative to the two bracketing LOD maps to yield a color value for the pixel. FIG. 19 graphically depicts the tri-linear interpolation operation between the two LOD maps 1702 and 1704.

Figure 20:
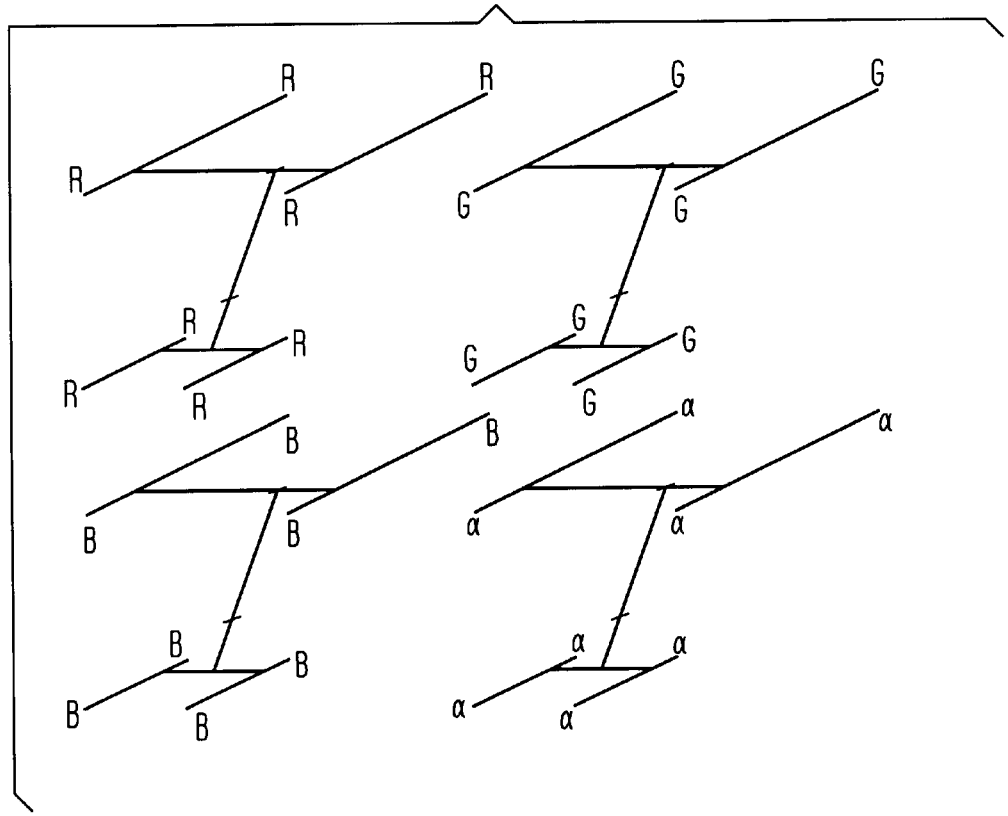

Normally, the tri-linear interpolation hardware simultaneously computes the four component values (R, G, B, $\alpha$) for a pixel, effectively requiring four tri-linear interpolation engines as graphically depicted in FIG. 20. In the case of the present invention, the objective is to use the same structure (s) to compute cubic polynomials.

Figure 21:
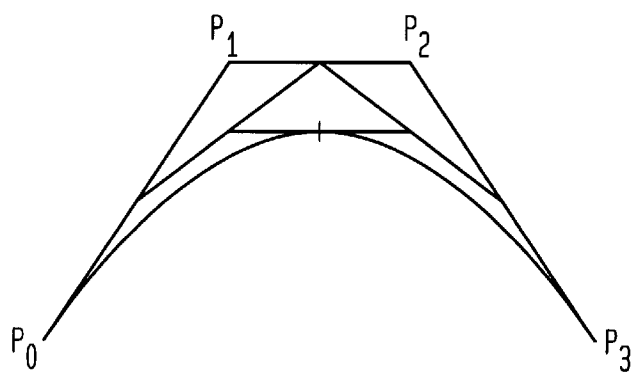
Figure 22:
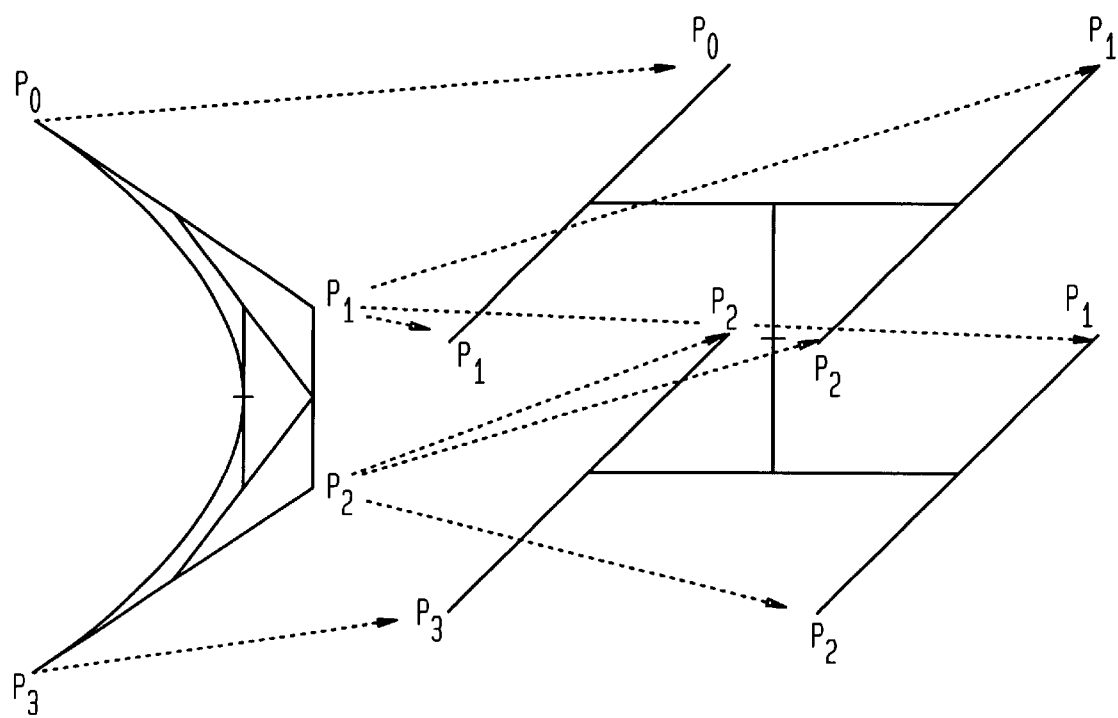
Figure 23A:
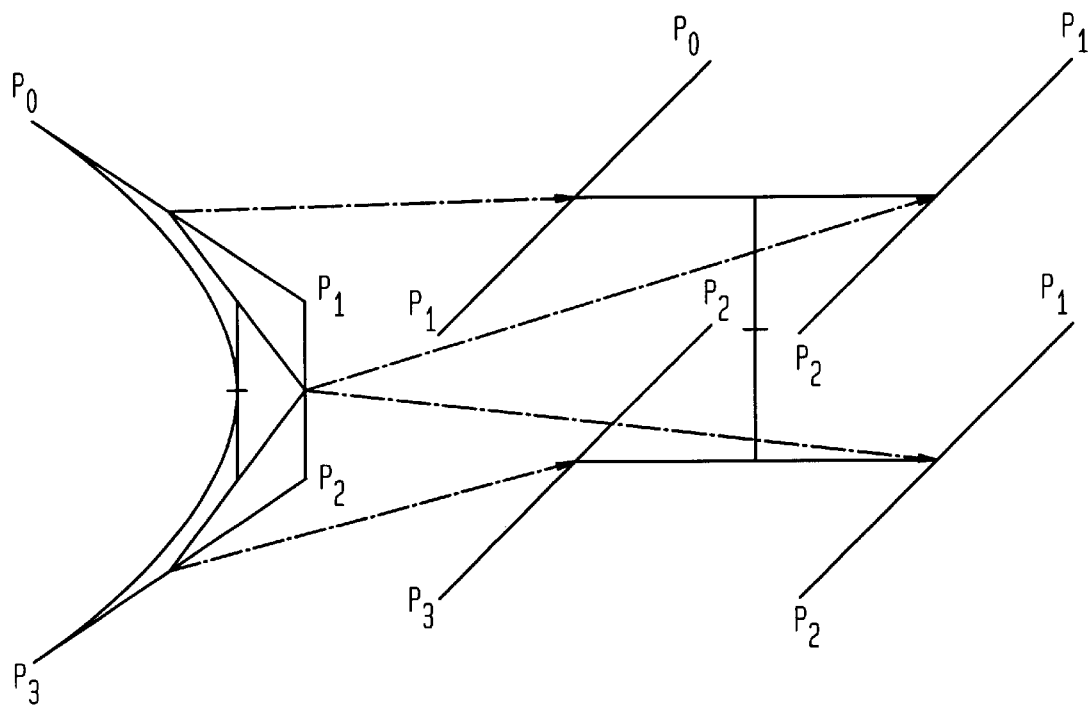
Figure 23B:
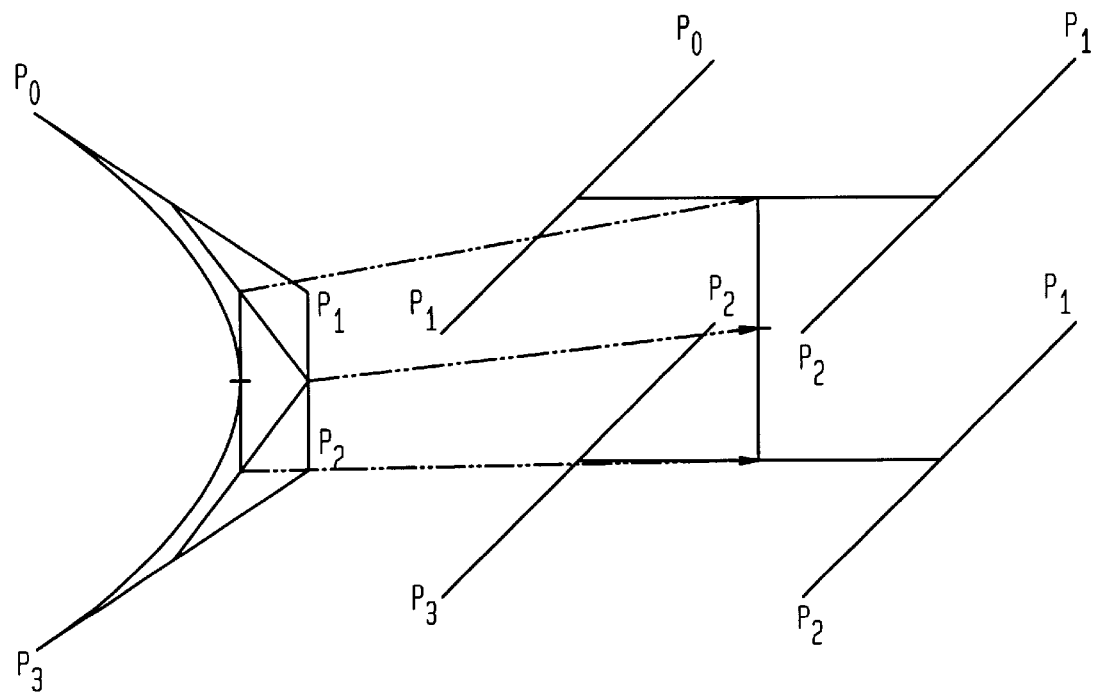
Figure 24:
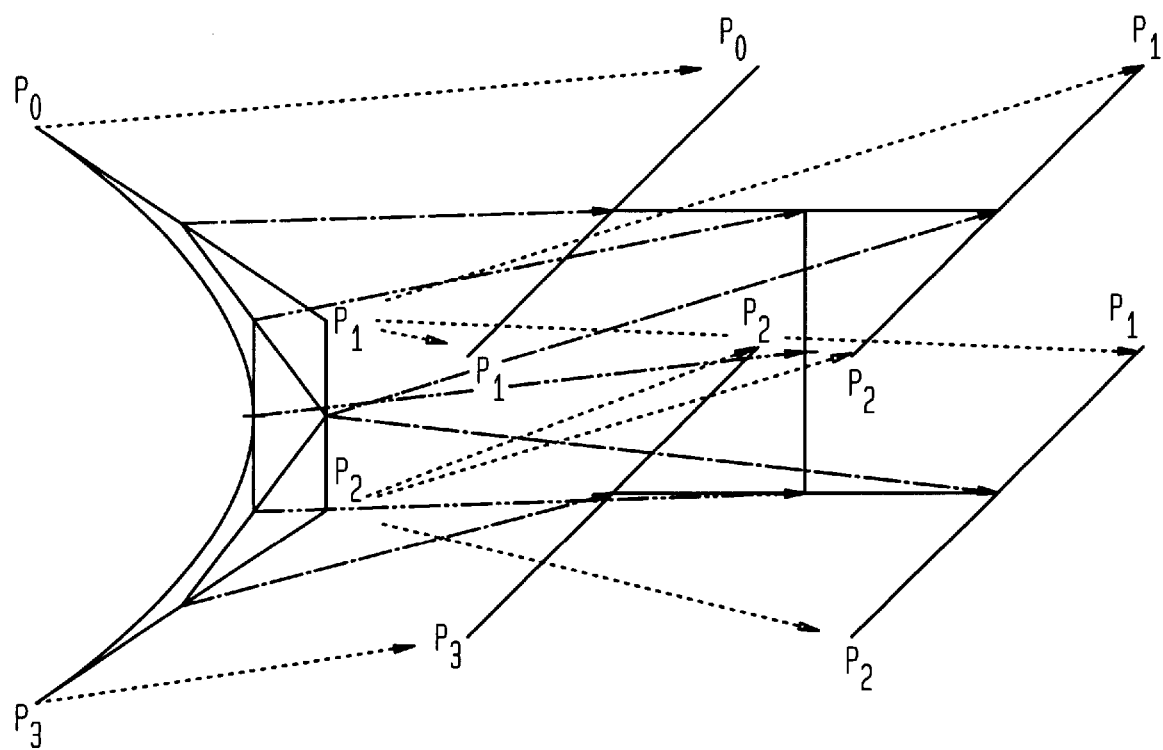

The inventor discovered that a cubic polynomial in Bézier form (using four control points, $P_0$, $P_1$, $P_2$ and $P_3$), as shown in FIG. 21, can be computed using nested linear interpolation. The mapping of the four scalar control points between conventional Bézier polynomial calculation (FIG. 21) and tri-linear interpolation (FIG. 20) is shown in FIG. 22. The mapping of the intermediate terms in the interpolation are shown in FIGS. 23a and 23b. The complete mapping (a combination of FIGS. 22–23) is shown in FIG. 24.

Thus, the four Bézier curves used to describe the detail in each texel can be computed using the four tri-linear interpolation engines (R, G, B, and α) of typical tri-linear interpolation hardware. Normally the four tri-linear interpolators use the same sets of weighting values in all four engines. However, to implement the present invention, two sets of weighting values must be used. Two engines will use the offset of the s texture coordinate within the texel, and the other two engines will use the offset of the t texture coordinate within the texel. As will be apparent to one skilled in the relevant art, the conventional tri-linear interpolation hardware will need to be augmented with logic to perform the various operations of texture procedure 100 (e.g., subtraction, looking up the outcode, etc.).

Another advantage of the present invention is that the four Bézier curves are defined by sixteen scalar values (four control points, $P_0$, $P_1$, $P_2$ and $P_3$, for each curve defined in a texel) and the boolean vector is defined by a 16-bit value. The boolean vector may be stored as a separate 16-bit value (e.g., luminance texture word) or as part of the curve textures. Therefore, if the latter implementation is chosen, the 16-bit boolean vector can be stored as the low bit for each of the sixteen scalars ($P_0$, $P_1$, $P_2$ and $P_3$ for four curves) without using any additional computer memory resources.

Yet still, an additional advantage of the current invention is that complex geometry can be transformed with very little computational overhead. As illustrated in FIG. 4, a complex figure can have any projective transform applied to it at the cost of transforming the polygon that uses the figure as a texture which is usually only four points. Normally, the transformation of such a figure would require that all of the points describing the figure be transformed—a much more costly operation.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A texture procedure method for directly rendering a curve bounded object from a high level curve-based description to a graphics display device, comprising the steps of:

(1) receiving the curve-based description of the curve bounded object;

(2) dividing the curve bounded object into a rectangular mesh of texels;

(3) defining a combination of curved geometry functions and a boolean function to detail the interior of each of said texels, said curved geometry functions dividing one or more said texels into two or more regions;

(4) evaluating said boolean function for each of said texels to obtain a boolean vector;

(5) selecting a Cartesian (s, t) coordinate pair, within the curve bounded object, for a pixel to be displayed;

(6) evaluating said curved geometry functions for each said (s, t) pair; and (7) rendering said pixel to the graphics display device.

2. The method of claim 1, wherein step (3) comprises: defining a horizontal axis function, f(s), and a vertical axis function, g(t), within each of said texels.

3. The method of claim 2, wherein step (6) comprises, for each said (s, t) pair, the steps of:

(a) locating which of said texels contains said (s, t) pair;

(b) computing a local Cartesian ($s_{local}$, $t_{local}$) coordinate pair for said pixel to be displayed;

(c) computing said function f(s) and said function g(t) for said ($s_{local}$, $t_{local}$) pair to obtain an outcode;

(d) using said outcode as an index into said boolean vector; and (e) drawing said pixel corresponding to said ($s_{local}$, $t_{local}$) pair if a bit of said boolean vector pointed to by said outcode is logically true.

4. The method of claim 1, wherein step (3) comprises: defining two horizontal axis functions, $f_0(s)$ and $f_1(s)$, and two vertical axis functions, $g_0(t)$ and $g_1(t)$, within each said texel.

5. The method of claim 4, wherein step (6) comprises, for each said (s, t) pair, the steps of:

(a) locating which of said texel contains said (s, t) pair;

(b) computing a local Cartesian ($s_{local}$, $t_{local}$) coordinate pair for said pixel to be displayed;

(c) computing said two horizontal functions, $f_0(s)$ and $f_1(s)$, and said two vertical functions, $g_0(t)$ and $g_1(t)$ for said ($s_{local}$, $t_{local}$) pair to obtain an outcode;

(d) using said outcode as an index into said boolean vector; and (e) drawing said pixel corresponding to said ($s_{local}$, $t_{local}$) pair if a bit of said boolean vector pointed to by said outcode is logically true.

6. The method of claim 1, wherein step (1) comprises the step of:

receiving a curve-based description of a character typeface.

7. The method of claim 1, further comprising the steps of:

storing the result of steps (1) to (4) as a geometric-texture during a preprocessing procedure; and loading said geometric-texture at run-time for performing steps (5) to (7).

8. The method of claim 1, wherein step (3) comprises the steps of:

defining a combination of cubic polynomial functions and a boolean function to detail the interior of each of said texels; and wherein steps (1) to (7) are performed using conventional tri-linear interpolation hardware.

9. A system for directly rendering a curve bounded object from a high level curve-based description to a graphics display device, comprising:

a first module that receives the curve-based description of the curve bounded object;

a second module that divides the curve bounded object into a rectangular mesh of texels;

a third module that defines a combination of curved geometry functions and a boolean function to detail the interior of each of said texels, said curved geometry functions dividing one or more said texels into two or more regions;

a fourth module that evaluates said boolean function for each of said texels to obtain a boolean vector;

a fifth module that selects a Cartesian (s, t) coordinate pair, within the curve bounded object, for a pixel to be displayed;

a sixth module that evaluates said curved geometry functions for said (s, t) pair; and a seventh module that renders said pixel to the graphics display device.

10. The system of claim 9, wherein said third module comprises:

a module that defines a horizontal axis function, f(s), and a vertical axis function, g(t), within each of said texels.

11. The system of claim 10, wherein said sixth module comprises:

a module that locates which of said texels contain said (s, t) pair;

a module that computes a local Cartesian ($s_{local}$, $t_{local}$) coordinate pair for said pixel to be displayed;

a module that computes said function f(s) and said function g(t) for said ($s_{local}$, $t_{local}$) pair to obtain an outcode;

a module that uses said outcode as an index into said boolean vector; and a module that draws said pixel corresponding to said ($s_{local}$, $t_{local}$) pair if a bit of said boolean vector pointed to by said outcode is logically true.

12. The system of claim 9, wherein said third module comprises:

a module that defines two horizontal axis functions, $f_0(s)$ and $f_1(s)$, and two vertical axis functions, $g_0(t)$ and $g_1(t)$, within each of said texels.

13. The system of claim 12, wherein said sixth module comprises:

a module that locates which of said texels contain said (s, t) pair;

a module that computes a local Cartesian ($s_{local}$, $t_{local}$) coordinate pair for said pixel to be displayed;

a module that computes said two horizontal functions, $f_0(s)$ and $f_1$, and said two vertical functions, $g_{0(t)}$ and $g_1(t)$, for said ($s_{local}$, $t_{local}$) pair to obtain an outcode;

a module that uses said outcode as an index into said boolean vector; and a module that draws said pixel corresponding to said ($s_{local}$, $t_{local}$) pair if a bit of said boolean vector pointed to by said outcode is logically true.

14. In a system for directly rendering a curve bounded object from a high level curve-based description to a graphics display device, a computer program product comprising a computer usable medium having computer readable program code means embodied in said medium for causing an application program to execute on a computer, said computer readable program code means comprising:

a first computer readable program code procedure that receives the curve-based description of the curve bounded object;

a second computer readable program code procedure that divides the curve bounded object into a rectangular mesh of texels;

a third computer readable program code procedure that details the interior of each of said texels by defining a combination of curved geometry functions and a boolean function, said curved geometric functions dividing one or more said texels into two or more regions;

a fourth computer readable program code procedure that creates each of said curved geometry functions for each of said texels by defining a horizontal axis function f(s) and a vertical axis function g(t) within each of said texels;

a fifth computer readable program code procedure that evaluates said boolean function for each of said texels to obtain a boolean vector;

a sixth computer readable program code procedure that selects a Cartesian (s, t) coordinate pair, within the curve bounded object, for a pixel to be displayed;

a seventh computer readable program code procedure that evaluates said curved geometry functions for each (s, t) pair; and an eighth computer readable program code procedure that renders said pixel to the graphics display device.

15. The computer program product of claim 14, further comprising:

a computer readable program code procedure that stores the result of said first, second, third and fourth procedures as geometric-texture during a preprocessing procedure; and a computer readable program code procedure that loads said geometric-texture at run-time for performing said fifth, sixth, seventh and eighth procedures.

* * * * *